United States Patent Office 3,564,768
Patented Feb. 23, 1971

3,564,768
COATED CORN SEED
Otto L. Hoffman, Shawnee, Kans., assignor to Gulf Research & Development Company, Pittsburgh, Pa., a corporation of Delaware
No Drawing. Filed Oct. 25, 1968, Ser. No. 770,856
Int. Cl. A01c 1/06
U.S. Cl. 47—57.6
2 Claims

ABSTRACT OF THE DISCLOSURE

Corn is protected from injury by N,N-dialkylthiolcarbamate ester pre-emergent herbicides by coating the corn seeds prior to planting with a non-phytotoxic quantity of a bifunctional compound selected from the group consisting of 1,8-naphthalic anhydride, lower alkyl 1,8-naphthalate esters, N,N-diallyl-1,8-naphthalamic acid, barium and tin 1,8-naphthalates, 1,8-naphthalic acid, propynylamine salts of strong inorganic acids, N,N'-diallyloxamide, N,N'-dipropynyloxamide, N,N,N',N'-tetrapropynyloxamide and N,N'-dipropynylmalonamide.

In U.S. Pat. 3,131,509 there is disclosed the coating of crop seeds with a non-phytotoxic quantity of an antagonistic agent for a selective herbicide, thereby protecting the crop from injury when the specific herbicide is employed to control weeds. The aforementioned patent specifically exemplifies the treatment of wheat seed with compounds which are antagonists to barban and to certain thiolcarbamate herbicides.

In U.S. Pat. 2,913,327 is disclosed a group of N,N-dialkylthiolcarbamate herbicides. One of these, S-ethyl N,N-dipropylthiolcarbamate (EPTC) has proved to be very effective and commercially attractive as a pre-emergent herbicide. It would be desirable to use this herbicide in corn fields but it has been found to cause abnormal growth and stunting of corn plants, leading to loss of yield. The problem has been complicated by introduction of new hybrid varieties of seed which are more susceptible to injury by EPTC.

I have discovered that corn plants can be protected against injury by the N,N-dialkylthiolcarbamates of U.S. Pat. 2,913,327 by coating the seeds prior to planting with an effective but substantially non-phytotoxic quantity of a bifunctional compound selected from the group consisting of 1,8-naphthalic acid, 1,8-naphthalic anhydride, lower alkyl 1,8-naphthalate esters, N,N-diallyl-1,8-naphthalamic acid, barium and tin 1,8-naphthalates, propynylamine salts of strong inorganic acids, N,N-dipropynyloxamide, N,N,N',N'-tetrapropynyloxamide, N,N'-diallyloxamide and N,N'-dipropynylmalonamide. The invention is described in detail and illustrated with specific examples in the discussion which follows.

The antagonistic agents are applied to corn seeds and their effectiveness is demonstrated in comparison with both normally growing corn and unprotected, injured corn by means of the following test procedure:

PROCEDURE FOR COMPARATIVE EVALUTION OF ANTAGONISTS

To 5.0 grams of single cross corn seed in a 3 dram vial is added 3% (150 mg.) of the test chemical and 0.1 ml. (2%) methanol. The vial is capped and shaken for 20 seconds in a Spex mixer. Five seeds are planted in a flat of greenhouse soil and lightly covered. EPTC (ethyl N,N-dipropylthiolcarbamate) is applied at a rate of 8 lbs./A. It is covered with soil and the flat is watered. In each flat are two rows of untreated and four rows of treated corn. When control corn (no herbicide) is 50 cm. tall, the treatments are rated according to the following system. Each treatment is rated according to the number of plants emerged (0–5) the number distorted by EPTC (0–5) and the height. Height is given the following numerical value: 0=no plants, 1 is 5 cm. or less and is equivalent to EPTC, 2 is 6 to 16 cm., 3 is 17 to 27 cm., 4 is 28 to 38 cm., and 5 is 39 cm. or taller. These numbers are given in their respective order. A rating of 5–0–5 means that five plants emerged, none were distorted and height was over 39 cm. The same procedure is repeated in a few instances, using only ½% by weight of a few specific compounds on the corn seeds.

Results obtained on a group of compounds are presented in the table below.

| | Rating (emergence-abnormality-height) | |
| --- | --- | --- |
| | 3% treatment | ½% treatment |
| Compound: | | |
| 1,8-naphthalic anhydride | 5-1-4 | 5-0-5 |
| 1,8-naphthalic acid | 5-0-5 | |
| Diethyl 1,8-naphthalate | 5-0-5 | |
| N,N'-dipropynylmalonamide | 5-0-5 | |
| N,N'-diallyloxamide | 5-0-5 | |
| N,N-diallyl-1,8-naphthalamic acid | 5-0-4 | 5-0-5 |
| Propynylamine hydrochloride | 3-0-4 | 5-0-4 |
| Barium 1,8-naphthalate | 5-0-5 | |
| Tin 1,8-naphthalate | 5-0-5 | |

From the tabulated data it will be seen that some of the herbicide antagonists give better results at lower application rates, indicating that the effect is complicated by phytotoxicity of the antagonist itself.

The preferred antagonists are 1,8-naphthalic anhydride and N,N,N'-tetrapropynyloxamide. The seed-treating substances are readily available as articles of commerce or may be manufactured by conventional methods from available substances, the amides being prepared by reaction of the acid chlorides with the corresponding amines. Use of these antagonists to treat seed corn prior to planting makes possible the application of EPTC at a rate of at least 10 lb. per acre, which in the past has been considered beyond the range of feasibility. As a result of operation of the method at such high rates of herbicide application, complete control of all undesired plant growth is obtained, in most instances. This type of result has been long desired in the growing of hybrid seed corn, where the appearance of both weeds and volunteer corn plants in the field is very detrimental. Operation of the preferred method in the field is illustrated in the following examples.

EXAMPLE 1

A plot of ground was tilled and prepared for planting corn. EPTC was then incorporated into the upper three inches of soil by thorough mixing, at rates of 6 lb., 12 lb. and 24 lb. per acre. Rows of Dekalb XL-45 and Pioneer 154fx0251f hybrid seed corn were planted two inches deep in the soil, after treatment with varying amounts of 1,8-naphthalic anhydride. The two varieties of seed corn were selected because they differ greatly in their susceptibility to injury by EPTC. Rows of untreated corn were planted in treated soil and in nearby plots of untreated soil for purposes of comparison.

About a week after planting, a rainy sason began, lasting about two weeks, during which time about eleven inches of rain fell. This occurrence tended to increase corn injury by EPTC.

The Pioneer variety of corn was given substantially complete protection from EPTC at 24 lb. per acre by ½ percent by weight of 1,8-naphthalic anhydride coated on the seed prior to planting. Substantially complete protection of the Dekalb corn from EPTC at 6 lb. per acre was also obtained with ½ percent 1,8-naphthalic anhydride on the seed. At a seed treatment level of 1.0 percent by weight the Dekalb corn was given substantially complete protection from EPTC at both 6 lb. and 12 lb. per acre.

In the areas treated with EPTC at rates of 12 lb. per acre and 24 lb. per acre there were no weeds during the entire growing season up to and including harvest time.

Where substantially complete protection from EPTC was obtained as disclosed above, there were no significant toxic side effects and corn grew to generally normal height by comparison to areas in which neither seeds nor soil was treated and weeds were removed by hand.

EXAMPLE 2

Dekalb XL-45 seed corn treated with N,N,N,N'-tetrapropynyloxamide was planted in soil prepared as in Example 1. Seed treatment of ½ to 4 percent by weight gave substantially complete protection against injury by EPTC at a rate of 6 lb. per acre.

I claim:

1. Corn seed bearing thereon a coating of a substantially non-phytotoxic amount of 1,8-naphthalic anhydride, sufficient to improve the resistance of the corn seed to S-ethyl N,N-dipropylthiolcarbamate.

2. Corn seed bearing thereon a coating of an effective but substantially non-phytotoxic quantity of a compound selected from the group consisting of 1,8-naphthalic acid, lower alkyl 1,8-naphthalate esters, barium and tin 1,8-naphthalates, 1,8-naphthalic anhydride, N,N-diallyl-1,8-napthalamic acid, propynylamine hydrochloride, N,N'-diallyloxamide, N,N'-dipropynylmalonamide, N,N,N',N'-tetrapropynyloxamide and N,N' dipropynyloxamide, sufficient to improve the resistance of the corn to a selective pre-emergence herbicide.

References Cited

UNITED STATES PATENTS

| 2,204,213 | 6/1940 | Grace | 71—77 |
|---|---|---|---|
| 2,280,756 | 4/1942 | Saukatis | 71—77 |
| 2,394,915 | 2/1946 | Jones | 71—77X |
| 2,411,359 | 11/1946 | Billman | 71—77 |
| 2,421,837 | 6/1947 | Hardman | 71—77X |
| 2,770,537 | 11/1956 | Smith et al. | 71—65 |
| 2,913,327 | 11/1959 | Tilles et al. | 117—100X |
| 2,954,643 | 10/1960 | Porter et al. | 117—100X |
| 3,112,220 | 11/1963 | Heiser et al. | 117—100 |
| 3,113,399 | 12/1963 | Eversole et al. | 47—57.6 |
| 3,131,509 | 5/1964 | Hoffman | 47—57.6 X |

WILLIAM D. MARTIN, Primary Examiner

M. R. P. PERRONE, JR., Assistant Examiner

U.S. Cl. X.R.

117—3